United States Patent
Jang et al.

(10) Patent No.: US 12,143,049 B2
(45) Date of Patent: Nov. 12, 2024

(54) MOTOR DRIVING APPARATUS AND METHOD FOR ALLEVIATING BURN-OUT OF THE SAME

(71) Applicants: Hyundai Motor Company, Seoul (KR); Kia Corporation, Seoul (KR)

(72) Inventors: Ji Woong Jang, Gwangmyeong-Si (KR); Sang Cheol Shin, Suwon-Si (KR); Yoo Jong Lee, Osan-Si (KR); Dong Hoon Park, Suwon-Si (KR); Ki Jong Lee, Hwaseong-Si (KR); Ho Tae Chun, Asan-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 201 days.

(21) Appl. No.: 17/985,621

(22) Filed: Nov. 11, 2022

(65) Prior Publication Data
US 2023/0412112 A1    Dec. 21, 2023

(30) Foreign Application Priority Data
Jun. 20, 2022    (KR) .......................... 10-2022-0074975

(51) Int. Cl.
*H02P 29/68*    (2016.01)
*H02P 27/08*    (2006.01)
*H02P 29/024*    (2016.01)

(52) U.S. Cl.
CPC .............. *H02P 29/68* (2016.02); *H02P 27/08* (2013.01); *H02P 29/027* (2013.01)

(58) Field of Classification Search
CPC ................................ H02P 29/68; H02P 27/08
USPC ......................................................... 318/472
See application file for complete search history.

(56) References Cited

U.S. PATENT DOCUMENTS

| | | | | |
|---|---|---|---|---|
| 9,586,495 B2* | 3/2017 | Kanzaki | .................. | B60L 58/10 |
| 10,227,085 B2* | 3/2019 | Kano | .................. | B62D 5/0406 |
| 2014/0125290 A1* | 5/2014 | Kim | ....................... | B60L 3/0023 |
| | | | | 320/135 |

FOREIGN PATENT DOCUMENTS

| | | |
|---|---|---|
| KR | 10-2021-0028363 | 3/2021 |
| KR | 10-2021-0107392 | 9/2021 |

OTHER PUBLICATIONS

Yongchan (KR 20210028363 A) Power Transforming Apparatus Having Thermal Protection Function Date Published Mar. 12, 2021 (Year: 2021).*

* cited by examiner

*Primary Examiner* — Jorge L Carrasquillo
(74) *Attorney, Agent, or Firm* — Morgan, Lewis & Bockius LLP

(57) ABSTRACT

A motor driving apparatus includes an inverter that includes a switching element connected between either terminal of a battery and a thermistor insulated from the switching element and that drives a motor through the switching element, a resistor connected between a sensing node to which one end of the thermistor is connected and a terminal of a low source voltage, and a motor controller configured for controlling a relay connected between the battery and the switching element based on a voltage of the sensing node.

16 Claims, 4 Drawing Sheets

MOTOR DRIVING APPARATUS AND METHOD FOR ALLEVIATING BURN-OUT OF THE SAME

CROSS-REFERENCE TO RELATED APPLICATION

The present application claims priority to Korean Patent Application No. 10-2022-0074975, filed Jun. 20, 2022, the entire contents of which is incorporated herein for all purposes by this reference.

BACKGROUND OF THE PRESENT DISCLOSURE

Field of the Present Disclosure

The present disclosure relates to a motor driving apparatus and a method of alleviating burnout of a motor driving apparatus, and more particularly, to a motor driving apparatus and method for alleviating additional burnout caused by burnout of a switching element inside an inverter.

DESCRIPTION OF RELATED ART

An inverter used in a vehicle is a component converting the DC voltage of a high-voltage battery into the AC voltage to drive a motor.

Recently, the charging time and driving distance of a vehicle have increasingly gained importance, and the capacity of a high-voltage battery is increasing.

Accordingly, when a switching element inside an inverter to which a high-voltage battery is directly connected is burnt out, an unlimited high current flows to the switching element to generate high heat, which may cause additional burnout on the inside of the inverter.

Generally, the inverter includes an overcurrent protection circuit in case the switching element is burnt out or a large current flows.

A method for the overcurrent protection circuit to detect/sense an overcurrent includes directly sensing the current flowing through a switching element and indirectly sensing the current by measuring a voltage at either end of a switching element.

However, when the switching element is burnt out by an insulation breakdown, the overcurrent protection circuit is also burnt out to err in sensing or be inoperable.

In the instant case, the overcurrent protection circuit may not sense the overcurrent so that the high current of the high-voltage battery flows into the inverter and additional burnout inside the inverter may cause a fire.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing motor driving apparatus and a controlling method thereof configured to detect the burnout of a switching element even when an overcurrent protection circuit for the switching element is inoperable caused by burnout of the switching element inside an inverter, effectively alleviating additional burnout caused by the burnout of the switching element inside the inverter.

Another object of the present disclosure is to provide a motor driving apparatus and a controlling method configured to prevent an unwanted disconnect of a relay due to causes other than the burnout of the switching element inside the inverter.

Yet another object of the present disclosure is to provide a motor driving apparatus and a controlling method thereof configured to ensure the stable operation of the circuits for disconnecting the relay based on the high voltage of the temperature sensing signal.

Technical objects to be achieved by the present disclosure are not limited to the technical objects described above, and other technical objects not described will be clearly understood by those skilled in the art to which the present disclosure pertains.

According to an exemplary embodiment of the present disclosure, the motor driving apparatus may include an inverter including a switching element connected between either terminal of a battery and a thermistor insulated from the switching element and driving a motor through the switching element, a resistor connected between a sensing node and a terminal of low source voltage, a first end of the thermistor being connected to the sensing node, and a motor controller configured for controlling a relay connected between the battery and the switching element based on the voltage of a temperature sensing signal output from the sensing node.

According to the exemplary embodiment of the present disclosure, the other end of the thermistor may be connected to a ground terminal.

According to the exemplary embodiment of the present disclosure, the resistance value of the thermistor may decrease as the internal temperature of the inverter increases.

According to the exemplary embodiment of the present disclosure, the voltage of the temperature sensing signal may be determined by a level of the low source voltage and a ratio of a value of the resistor to a resistance value of the thermistor.

According to the exemplary embodiment of the present disclosure, the motor controller may measure the internal temperature of the inverter and the change rate of the internal temperature of the inverter based on the voltage of the temperature sensing signal and control the relay according to the measurement results.

According to the exemplary embodiment of the present disclosure, the motor controller may disconnect the relay when the internal temperature of the inverter is higher than a preset temperature and the change rate of the internal temperature of the inverter is greater than a preset change rate.

According to the exemplary embodiment of the present disclosure, the motor controller may actuate the relay when the internal temperature of the inverter is equal to or lower than the preset temperature or the change rate of the internal temperature of the inverter is equal to or less than the preset change rate.

According to the exemplary embodiment of the present disclosure, the motor controller may be configured to control the relay to be disconnected through a battery management system.

According to the exemplary embodiment of the present disclosure, a gate driver receiving a pulse width modulation signal from the motor controller based on the low source voltage and boosting the voltage of the pulse width modulation signal based on the high source voltage to switch the switching element may be further included.

According to the exemplary embodiment of the present disclosure, the inverter may further include an overcurrent protection circuit sensing a flow of the overcurrent to the switching element to output an overcurrent sensing signal, and the gate driver may receive the overcurrent sensing signal from the overcurrent protection circuit based on the high source voltage and drop the voltage of the overcurrent protection circuit based on the low source voltage to output an overcurrent fault signal to the motor controller.

According to the exemplary embodiment of the present disclosure, the motor controller may disconnect the relay based on the overcurrent fault signal.

According to an exemplary embodiment of the present disclosure, a method of alleviation burnout of a motor driving apparatus may include generating a temperature sensing signal based on a resistance value of a thermistor insulated from a switching element included in an inverter, measuring the internal temperature of the inverter and a change rate of the internal temperature of the inverter based on the voltage of the temperature sensing signal, and controlling a relay connected between a battery and the switching element based on a measure results.

According to the exemplary embodiment of the present disclosure, in the generating of the temperature sensing signal, the voltage of the temperature sensing signal may be determined by the source voltage and the ratio of the value of the resistor outside the inverter to the resistance value of the thermistor.

According to the exemplary embodiment of the present disclosure, in the measuring, the measured internal temperature of the inverter may increase as the voltage of the temperature sensing signal decreases.

According to the exemplary embodiment of the present disclosure, in the controlling of the relay, the relay may be disconnected when the internal temperature of the inverter is higher than a preset temperature and the change rate of the internal temperature of the inverter is greater than a preset change rate.

According to the exemplary embodiment of the present disclosure, the controlling of the relay may include comparing, by the motor controller, the internal temperature of the inverter with the preset temperature and the change rate of the internal temperature of the inverter with the preset change rate, requesting, by the motor controller, the battery management system to disconnect the relay when the internal temperature of the inverter is higher than the preset temperature and the change rate of the internal temperature of the inverter is greater than the preset change rate, and disconnecting the relay by the battery management system.

According to an exemplary embodiment of the present disclosure, the burnout of the switching element may be alleviated even when the overcurrent protection circuit for the switching element is inoperable by isolating the thermistor whose resistance value varies according to the internal temperature of the inverter from the switching element.

Furthermore, according to an exemplary embodiment of the present disclosure, the internal temperature of the inverter and the change rate of the internal temperature are measured based on the voltage of the temperature sensing signal output from the thermistor, and the relay connected between the battery and the inverter is disconnected when the internal temperature of the inverter and the change rate of the internal temperature satisfy preset conditions so that the disconnect of the relay due to causes other than the burnout of the switching element inside the inverter may be prevented.

Furthermore, according to an exemplary embodiment of the present disclosure, the circuits for disconnecting the relay based on the voltage of the temperature sensing signal may be stably operated by setting the voltage of the temperature sensing signal output from the thermistor below the driving voltage of the switching element.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
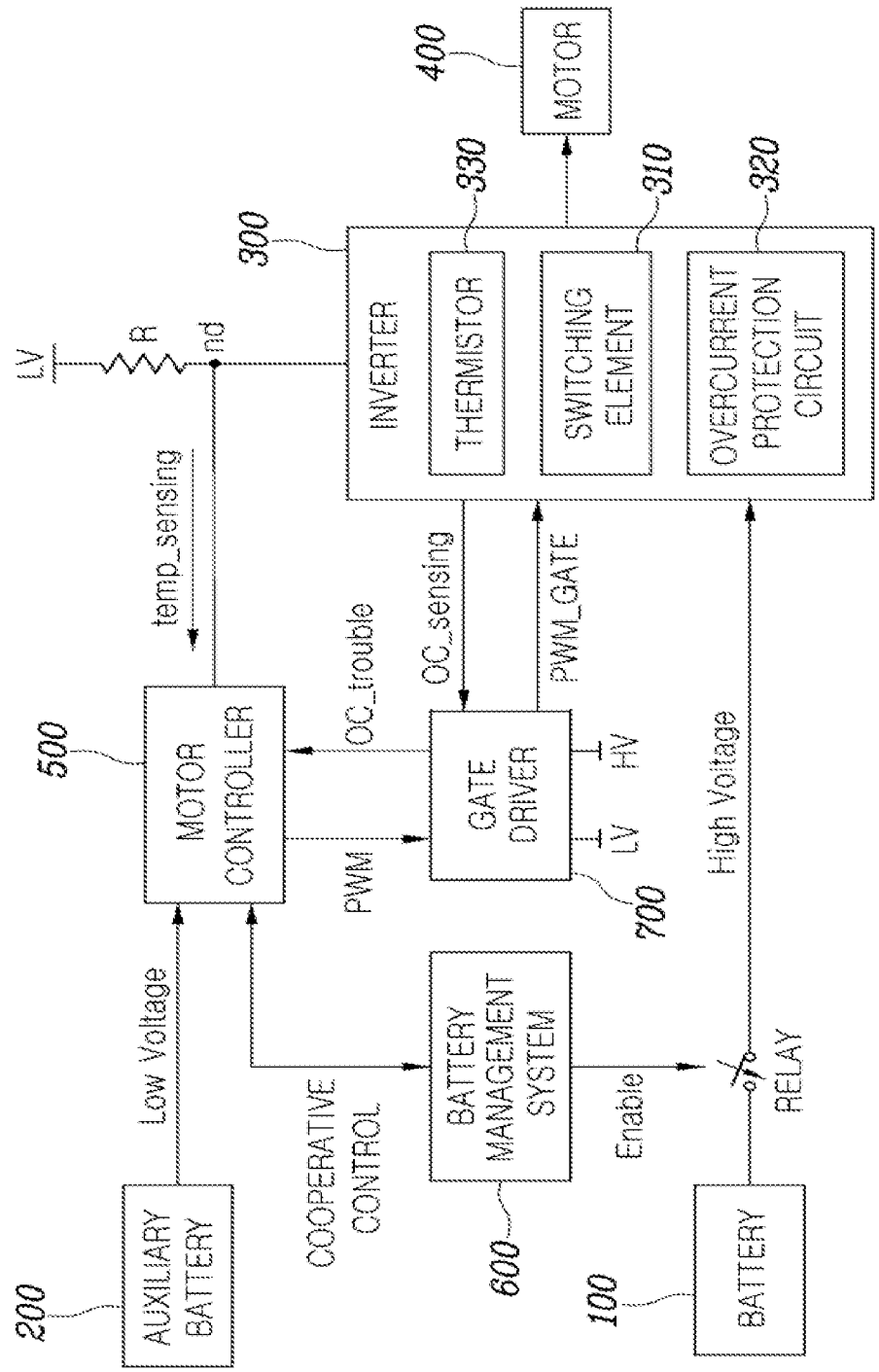
FIG. 1 is a block diagram illustrating a configuration of motor driving apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The term "preset" used in describing the following embodiments means that the value of a parameter is predetermined when the parameter is used in a process or algorithm. The value of the parameter may be set when the process or algorithm starts or may be set during a period when the process or algorithm is performed according to the embodiment.

Terms such as "first" and "second" used in distinguishing various components are not limited to the components. For example, a first component may be referred to as a second component, and conversely, a second component may be referred to as a first component.

When a component is referred to as being "connected" or "coupled" to another component, the component may be directly connected or coupled to the another component, but it is to be understood that other components may exist in between. On the other hand, when a component is referred to as being "directly connected" or "directly coupled" to another component, it is to be understood that there are no intervening components present.

Hereinafter, the present disclosure will be described in more detail through embodiments. The exemplary embodiments are only for illustrating the present disclosure and these embodiments do not limit the scope of protection or the rights of the present disclosure.

FIG. 1 is a block diagram illustrating a configuration of a motor driving apparatus 10 according to an exemplary embodiment of the present disclosure.

As illustrated in FIG. 1, a motor driving apparatus 10 may include a battery 100, an auxiliary battery 200, an inverter 300, a motor 400, a motor controller 500, a battery management system 600, a resistor R, and a relay RELAY.

The inverter 300 may include at least one switching element 310, an overcurrent protection circuit 320, and a thermistor 330.

At least one switching element 310 may be connected between either terminal of the battery 100 supplying a high voltage. The inverter 300 may convert a direct current of the battery 100 into an alternating current as at least switching element 310 is switched by a switch gate driving signal PWM_GATE and the inverter 300 may drive the motor 400 by supplying the converted alternating current to the motor 400.

The overcurrent protection circuit 320 may sense an overcurrent flowing to at least one switching element 310 and output an overcurrent sensing signal OC sensing. According to the exemplary embodiment of the present disclosure, the overcurrent protection circuit 320 may sense an overcurrent flowing to at least one switching element in various ways. For example, the overcurrent protection circuit 320 may directly sense the current of the switching element 310 or indirectly sense the current of the switching element 310 by sensing the voltage at either end of the switching element 310.

However, the overcurrent protection circuit 320 using these methods may be inoperable or err in sensing when the burnout occurs in the switching element 310 and insulation breakdown occurs in the switching element 310 so that additional burnout of the inverter 300 caused by the burnout of the switching element 310 is inevitable.

Accordingly, an exemplary embodiment of the present disclosure includes a method of alleviating the additional burnout of the inverter 300 even when the burnout occurs in the switching element 310 and the overcurrent protection circuit 320 is inoperable or err in sensing is disclosed.

The thermistor 330 is insulated from at least one switching element 310 and may be connected between the ground terminal and a sensing node nd. The thermistor 330 may have a resistance value varying according to the internal temperature of the inverter 300. According to the exemplary embodiment of the present disclosure, the thermistor 330 may be implemented as a negative temperature coefficient (NTC) thermistor having a decreasing resistance value as the internal temperature of the inverter 300 increases. Because the thermistor 330 is insulated from the switching element 310, the thermistor 330 may sense the additional burnout of the inverter 300 by sensing the internal temperature of the inverter 300 even when the overcurrent protection circuit 320 is inoperable caused by the burnout of the switching element 310. However, the thermistor 330 is referred to as an illustrative instrument of a temperature sensor measuring the internal temperature of the inverter 300, and it is evident to those skilled in the art that any form of a temperature sensor may apply to the present disclosure as long as the sensor is insulated from at least one switching element 310 but is configured to measure the internal temperature of the inverter 300.

The configuration and operating method of the inverter 300 will be described later with reference to FIG. 2.

The resistor R may be connected between a terminal of a low source voltage LV and a sensing node nd. Accordingly, the voltage of the temperature sensing signal temp_sensing output from the sensing node nd may be determined by the level of the low source voltage LV and the ratio of the value of the resistor to the resistance value of the thermistor 330. For example, the resistance value of the thermistor 330 decreases as the internal temperature of the inverter 300 increases so that the voltage of the temperature sensing signal temp-sensing may also decrease.

The low source voltage LV is an internal source voltage for driving an internal circuit of the motor controller 500 and may be generated by the motor controller 500 supplied with a low voltage from the auxiliary battery 200 but is not necessarily limited thereto.

The voltage of the temperature sensing signal temp_sensing is determined based on the level of the low source voltage LV rather than the high source voltage HV so that the voltage of the temperature sensing signal may be set lower than the driving voltage of the switching element 310 inside the inverter 300. That is, the voltage of the temperature sensing signal temp_sensing is set relatively low based on the level of the low source voltage LV so that the motor controller 500 supplied with the low voltage from the auxiliary battery 200 and operated in the low voltage region may stably receive the temperature sensing signal temp_sensing.

The motor controller 500 may output a pulse width modulation PWM signal to drive the motor 400.

The motor controller 500 may receive the temperature sensing signal temp-sensing from the sensing node nd. The motor controller 500 may control the relay connected between the battery 100 and the switching element 310 inside the inverter 300 based on the voltage of the received temperature sensing signal temp_sensing.

The motor controller 500 may measure the internal temperature of the inverter 300 and the change rate of the internal temperature of the inverter 300 based on the voltage of the temperature sensing signal temp_sensing. For example, the internal temperature of the inverter 300 as measured by the motor controller 500 may increase as the voltage of the temperature sensing signal temp_sensing decreases. Furthermore, the change rate of the internal temperature of the inverter 300 as measured by the motor controller 500 may increase as the change rate of the voltage of the temperature sensing signal increases.

The motor controller 500 may control the relay RELAY connected between the battery 100 and the switching element 310 inside the inverter 300 based on the measured internal temperature of the inverter 300 and the measured change rate of the internal temperature of the inverter 300. The motor controller 500 may disconnect the relay connected between the battery 100 and the switching element 310 inside the inverter 300 when the internal temperature of the inverter 300 is higher than a preset internal temperature and the change rate of the internal temperature of the inverter 300 is greater than a preset change rate. In other words, the motor controller 500 may actuate without disconnecting the relay connected between the battery 100 and the switching element 310 inside the inverter 300 when the internal temperature of the inverter 300 is equal to or lower than the preset internal temperature or when the change rate of the internal temperature of the inverter 300 is equal to or less than the preset change rate. The preset internal temperature and the preset change rate of the internal temperature may be set diversely in different embodiments.

The motor controller 500 is configured to control the relay RELAY based on the internal temperature of the inverter 300 and the change rate of the internal temperature inside the inverter 300 so that unwanted disconnect of the relay may be prevented. If the motor controller 500 controls the relay based on the internal temperature of the inverter 300 only unlike the present embodiment, there is a problem that the relay is unnecessarily disconnected when the internal temperature of the inverter 300 rises due to insufficient coolant or when the internal temperature of the inverter 300 instantaneously shoots up due to external noise. Similarly, if the motor controller 500 controls the relay based on the change rate of the internal temperature of the inverter 300 only, there is a problem that the relay is unnecessarily disconnected when the change rate of the internal temperature of the inverter 300 instantaneously shoots up due to external noise or when a connector or the like loses contact due to vehicle vibration and the like.

The motor controller 500 may control the relay to be disconnected through the battery management system 600 based on the internal temperature of the inverter 300 and the change rate of the internal temperature of the inverter 300. Furthermore, the motor controller 500 may control the relay to be disconnected through the battery management system 600 when the motor controller 500 receives an overcurrent fault signal OC trouble from a gate driver 700.

The battery management system (BMS), 600 may check the state of the battery 100 such as voltage, current, and temperature of the battery 100 and perform charge and discharge control. Furthermore, the battery management system 600 may generate an enable signal Enable for actuating/disconnecting the relay to control the relay. Accordingly, that the motor controller 500 performs cooperative control with the battery management system 600 may mean that the motor controller 500 requests the battery management system 600 to disconnect the relay once the motor controller 500 determines to disconnect the relay and the battery management system 600 generates an enable signal Enable to control the relay.

The BMS 600 may cooperate with the motor controller 500 and generate an enable signal Enable to disconnect/actuate the relay.

The gate driver 700 is connected to the motor controller 500 operating in the low voltage region and the inverter 300 operating in the high voltage region and may boost the signal output from the motor controller 500 to output the signal to the inverter 300 or may drop the signal output from the inverter 300 to output the signal to the motor controller 500.

The gate driver 700 may be supplied with the low source voltage LV to receive the PWM signal from the motor controller 500 and the gate driver 700 may boost a voltage of the PWM signal based on the high source voltage HV to output a switch gate driving signal PWM_GATE to the inverter 300.

Furthermore, the gate driver 700 may be supplied with the high source voltage HV to receive an overcurrent sensing signal OC sensing from the inverter 300 and the gate driver 700 may drop a voltage of the overcurrent sensing signal OC sensing based on the low source voltage LV to output an overcurrent fault signal OC trouble. Furthermore, the gate driver 700 may block the output of the switch gate driving signal PWM_GATE when receiving the overcurrent sensing signal OC sensing from the inverter 300, alleviating the additional burnout of the inverter 300.

Figure 2:
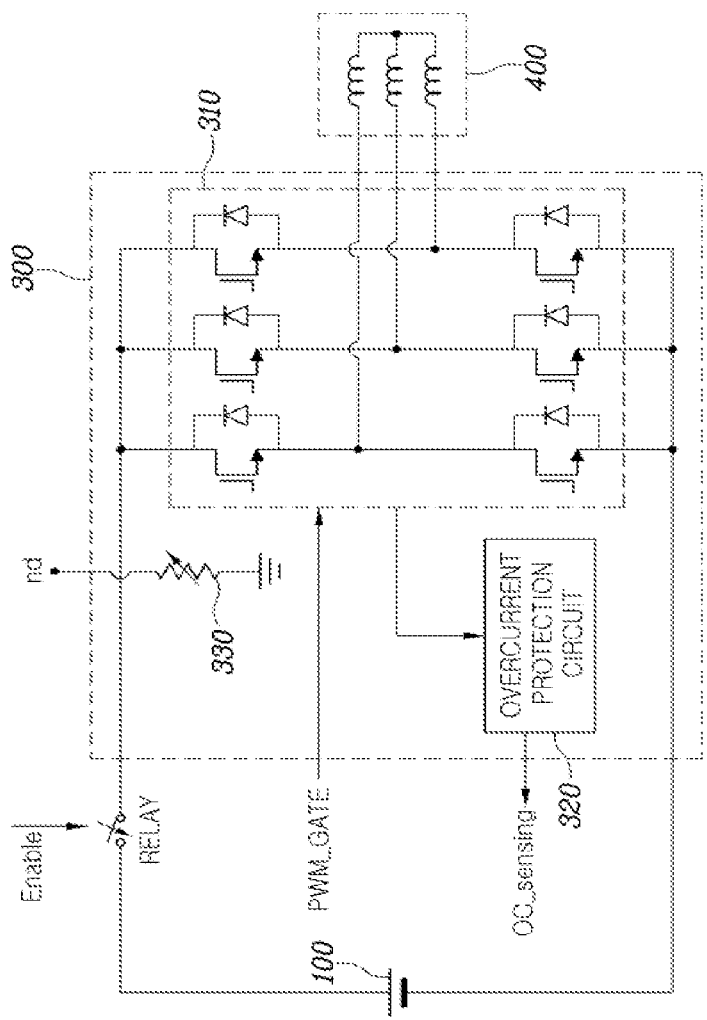
FIG. 2 is a circuit diagram illustrating a configuration of a battery, a relay, an inverter, and a motor included in the motor driving apparatus illustrated in FIG. 1.

FIG. 2 is a circuit diagram illustrating a configuration of the battery 100, relay, inverter 300, and motor 400 included in the motor driving apparatus 10 illustrated in FIG. 1.

The battery 100 may have a positive terminal and a negative terminal.

The relay is connected between the battery 100 and the switching element 310 inside the inverter 300 and may be disconnected/actuated by the enable signal Enable. According to the exemplary embodiment of the present disclosure, the relay is connected between the positive terminal of the battery 100 and the inverter 300 but may be connected between the negative terminal of the battery 100 and the inverter 300 in other exemplary embodiments of the present disclosure.

The inverter 300 may include the switching element 310 connected between either terminal of the battery 100, the overcurrent protection circuit 320, and the thermistor 330 insulated from the switching element 310.

A plurality of switching elements 310 may be included as in an exemplary embodiment of the present disclosure. As the switching element 310 is switched by the switch gate driving signal PWM_GATE, the inverter 300 may convert the DC voltage of the battery 100 into an AC voltage corresponding to each of phases. The inverter 300 may provide the motor 400 with an AC voltage corresponding to each of the inverters 300 to drive the motor 400.

The overcurrent protection circuit 320 may sense an overcurrent flowing to the switching element 310 to output the overcurrent sensing signal OC sensing. For example, the overcurrent protection circuit 320 may directly sense the current of the switching element 310 or indirectly sense the current of the switching element 310 by sensing the voltage at either end of the switching element 310. Accordingly, unlike the thermistor 310 insulated from the switching element 310, the overcurrent protection circuit 320 may be inoperable or err in sensing when the burnout occurs in the switching element 310, and when an insulation breakdown of the switching element 310 occurs so that the additional burnout of the inverter 300 caused by the burnout of the switching element 310 may not be prevented.

The thermistor 330 is insulated from the switching element 310 and may be connected between the ground terminal and the sensing node nd. The thermistor 330 may have a resistance value varying according to the internal temperature of the inverter 300. According to the exemplary embodiment of the present disclosure, the thermistor 330 may be implemented as a negative temperature coefficient (NTC) thermistor including a decreasing resistance value as the internal temperature of the inverter 300 increases. Accordingly, insulation from the switching element 310 allows the thermistor 330 to detect the internal temperature of the inverter 300 to detect the additional burnout of the inverter 300 even when the overcurrent protection circuit 320 is inoperable caused by the burnout of the switching element 310.

The motor 400 may have a plurality of windings corresponding to each of phases.

Figure 3:
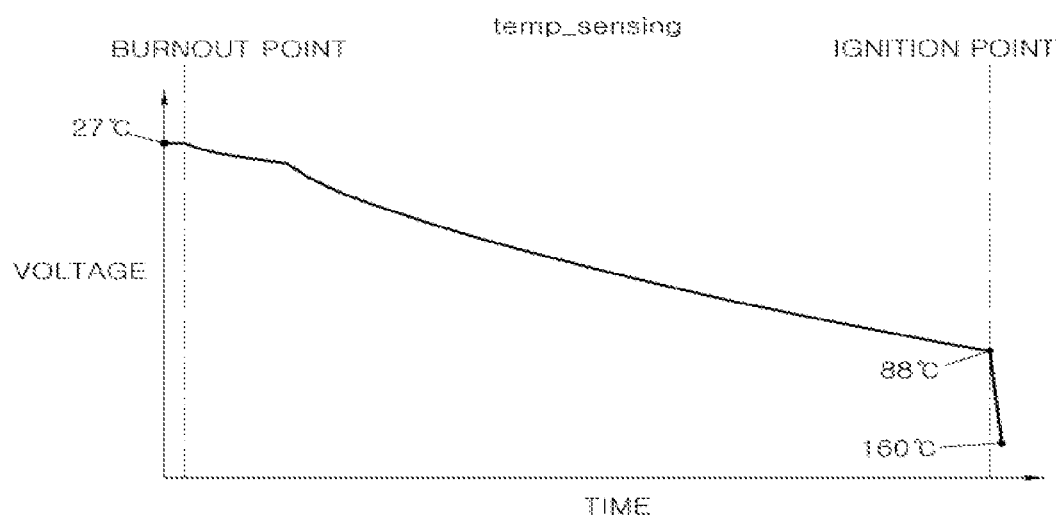
FIG. 3 is a view for describing changes in the internal temperature of an inverter caused by the burnout of the switching element illustrated in FIG. 2.

FIG. 3 is a view for describing the change in the internal temperature of the inverter 300 caused by the burnout of the switching element 310 illustrated in FIG. 2.

As illustrated in FIG. 3, the internal temperature of the inverter 300 rises as the switching element 310 is burnt out. The resistance value of the thermistor 330 decreases as the internal temperature of the inverter 300 increases. Accordingly, the voltage of the temperature sensing signal temp_sensing also decreases over time.

On the other hand, when the burnout of the switching element 310 causes the inverter 300 to catch fire, the change rate of the internal temperature of the inverter 300 instantaneously shoots up, and the change rate of the voltage of the temperature sensing signal temp_sensing also rises consequently.

Accordingly, according to the exemplary embodiment of the present disclosure, the motor controller (500 in FIG. 1) determines whether the internal temperature of the inverter 300 is higher than the preset internal temperature and whether the change rate of the internal temperature of the inverter 300 is greater than the preset change rate based on the voltage of the temperature sensing signal temp_sensing so that the relay connected between the battery 100 and the switching element 310 inside the inverter 300 is disconnected before the burnout of the switching element 310 causes the inverter 300 to catch fire.

Figure 4:
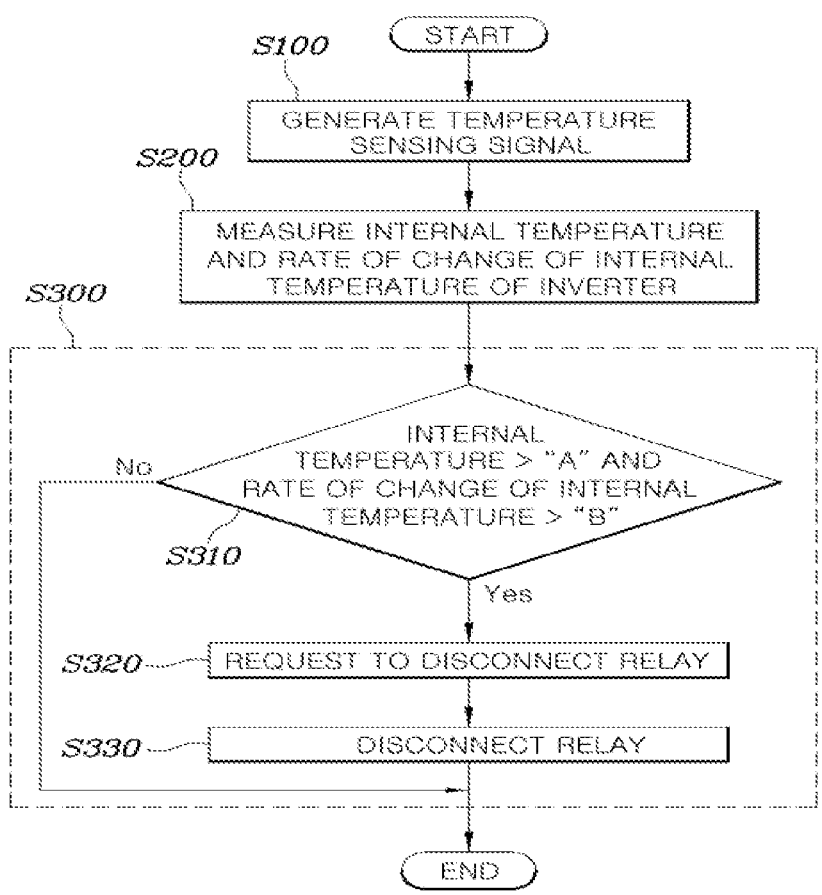
FIG. 4 is a flowchart of a method of alleviating the burnout of the motor driving apparatus illustrated in FIG. 1.

FIG. 4 is a flowchart for describing a method of alleviating the burnout of the motor driving apparatus 10 illustrated in FIG. 1.

As illustrated in FIG. 4, the method of alleviating the burnout of the motor driving apparatus 10 may include generating a temperature sensing signal temp_sensing (S100), measuring the internal temperature of an inverter 300 and a change rate of the internal temperature of the inverter 300 based on the voltage of the temperature sensing signal temp_sensing (S200), and controlling a relay based on measurement results (S300).

In the generating of the temperature sensing signal temp_sensing (S100), the temperature sensing signal temp_sensing may be generated based on a resistance value of a thermistor 330 insulated from a switching element 310 included in the inverter 300. In the generating the temperature sensing signal temp_sensing (S100), the temperature sensing signal temp_sensing indicating the internal temperature of the inverter 300 is generated based on the resistance value of the thermistor 330 insulated from the switching element 310 so that the burnout of the switching element 310 may be detected even when an overcurrent protection circuit 320 is inoperable.

In the generating of the temperature sensing signal temp_sensing (S100), voltage of the temperature sensing signal temp_sensing may be determined by the low voltage source voltage LV and the ratio of the value of a resistor R outside the inverter to the resistance value of the thermistor 330. In the generating of the temperature sensing signal temp_sensing (S100), the voltage of the temperature sensing signal temp_sensing is determined based on the low source voltage LV so that the motor controller 500 may stably receive the temperature sensing signal temp_sensing in the low voltage region.

In the measure of the internal temperature of the inverter 300 and the change rate of the internal temperature of the inverter 300 (S200), the motor controller 500 may receive the temperature sensing signal temp-sensing and measure the internal temperature of the inverter 300 and the change rate of the internal temperature of the inverter 300 based on the voltage of the temperature sensing signal temp-sensing.

In the measuring of the internal temperature of the inverter 300 and the change rate of the internal temperature of the inverter 300 (S200), the measured internal temperature of the inverter 300 may increase as the voltage of the temperature sensing signal temp_sensing decreases, and the measured change rate of the internal temperature of the inverter 300 may increase as the change rate of the voltage of the temperature sensing signal temp_sensing increases.

In the controlling of the relay based on the measurement results (S300), the relay connected between the battery 100 and the switching element 310 inside the inverter 300 may be controlled based on the results in the measuring (S200). In the controlling of the relay based on the measurement results (S300), the relay may be disconnected when the internal temperature of the inverter 300 is higher than the preset temperature 'A' and the change rate of the internal temperature of the inverter 300 is greater than the preset change rate 'B'. In contrast, in the controlling of the relay based on the measurement results (S300), the relay may be actuated without disconnect when the internal temperature of the inverter 300 is equal to or lower than the preset temperature 'A' or when the change rate of the internal temperature of the inverter 300 is equal to or less than the preset change rate 'B'. In the controlling of the relay based on the measurement results (S300), the relay is controlled based on the internal temperature of the inverter 300 and the change rate of the internal temperature of the inverter 300 so that the unwanted disconnect of the relay may be prevented.

The controlling of the relay based on the measurement results (S300) may include comparing (S310), requesting the disconnect of the relay (S320), and disconnecting the relay (S330).

In the comparing (S310), the motor controller 500 may compare the internal temperature of the inverter 300 with the preset temperature 'A' and the change rate of the internal temperature of the inverter 300 with the preset change rate of the temperature 'B'.

In the requesting of the disconnect of the relay (S320), the motor controller 500 may request the battery management system 600 to disconnect the relay when the internal temperature of the inverter 300 is higher than the preset temperature 'A' and the change rate of the internal temperature of the inverter 300 is greater than the preset change rate B'.

The BMS 600 may receive a request to disconnect the relay and disconnect the relay in the disconnecting of the relay (S330).

As described above, according to the exemplary embodiment of the present disclosure, the motor driving apparatus and the method of alleviating the burnout of the motor driving apparatus may sense the burnout of the switching element even when the overcurrent protection circuit for the switching element is inoperable.

Furthermore, according to the exemplary embodiment of the present disclosure, the motor driving apparatus and the method of alleviating the burnout of the motor driving apparatus measure the internal temperature and the change rate of the internal temperature of the inverter based on the voltage of the temperature sensing signal output from the thermistor and determine to disconnect the relay connected between the battery and the inverter when the internal temperature and the change rate of the internal temperature of the inverter satisfy preset conditions so that the disconnect of the relay due to causes other than the burnout of the switching element inside the inverter may be prevented.

Furthermore, according to the exemplary embodiment of the present disclosure, the motor driving apparatus and the method of alleviating the burnout of the motor driving apparatus allow stable operations of the circuits for disconnecting the relay based on the voltage of the temperature sensing signal by setting the voltage of the temperature sensing signal output from the thermistor lower than the driving voltage of the switching element.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus of a motor, the apparatus comprising:
   an inverter including a switching element connected between either terminal of a battery and a thermistor insulated from the switching element and configured for driving the motor through the switching element;
   a resistor connected between a sensing node and a terminal of a low source voltage, a first end of the thermistor being connected to the sensing node; and
   a motor controller configured for controlling a relay connected between the battery and the switching element based on a voltage of the sensing node.

2. The motor driving apparatus of claim 1, wherein a second end of the thermistor is connected to a ground terminal.

3. The motor driving apparatus of claim 1, wherein a resistance value of the thermistor decreases as an internal temperature of the inverter increases.

4. The motor driving apparatus of claim 1, wherein the voltage of the sensing node is determined by a level of the low source voltage and a ratio of a value of the resistor to a resistance value of the thermistor.

5. The motor driving apparatus of claim 1, wherein the motor controller is configured to measure an internal temperature of the inverter and a change rate of the internal temperature of the inverter based on the voltage of the sensing node to control the relay based on a result of the measuring.

6. The motor driving apparatus of claim 5, wherein the motor controller is configured to disconnect the relay when the internal temperature of the inverter is higher than a preset temperature and the change rate of the internal temperature of the inverter is greater than a preset change rate.

7. The motor driving apparatus of claim 6, wherein the motor controller is configured to actuate the relay when the internal temperature of the inverter is equal to or lower than the preset temperature or when the change rate of the internal temperature of the inverter is equal to or less than the preset change rate.

8. The motor driving apparatus of claim 1, wherein the motor controller is configured to control the relay to be disconnected through a battery management system.

9. The motor driving apparatus of claim 1, further including a gate driver that receives a pulse width modulation signal from the motor controller based on the low source voltage and that boosts a voltage of the pulse width modulation signal based on a high source voltage to switch the switching element.

10. The motor driving apparatus of claim 9,
wherein the inverter further includes an overcurrent protection circuit configured for sensing a flow of an overcurrent to the switching element to output an overcurrent sensing signal, and
wherein the gate driver receives the overcurrent sensing signal from the overcurrent protection circuit based on the high source voltage and drops a voltage of the overcurrent sensing signal based on the lower source voltage to output an overcurrent fault signal to the motor controller.

11. The motor driving apparatus of claim 10, wherein the motor controller is configured to disconnect the relay based on the overcurrent fault signal.

12. A method of alleviating burnout of a motor driving apparatus, the method including:
generating a temperature sensing signal based on a resistance value of a thermistor insulated from a switching element included in an inverter;
measuring an internal temperature of the inverter and a change rate of the internal temperature of the inverter based on a voltage of the temperature sensing signal; and
controlling, by a motor controller, a relay connected between a battery and the switching element based on a result of the measuring.

13. The method of claim 12, wherein, in the generating of the temperature sensing signal, the voltage of the temperature sensing signal is determined by source voltage and a ratio of a value of a resistor outside the inverter to a resistance value of the thermistor.

14. The method of claim 12, wherein, in the measuring, the measured internal temperature of the inverter increases as the voltage of the temperature sensing signal decreases.

15. The method of claim 12, wherein, in the controlling of the relay, the relay is disconnected when the internal temperature of the inverter is higher than a preset temperature and the change rate of the internal temperature of the inverter is greater than a preset change rate.

16. The method of claim 15, wherein the controlling of the relay includes:
comparing, by the motor controller, the internal temperature of the inverter with the preset temperature and the change rate of the internal temperature of the inverter with the preset change rate,
requesting, by the motor controller, a battery management system to disconnect the relay when the internal temperature of the inverter is higher than the preset temperature and the change rate of the internal temperature of the inverter is greater than the preset change rate, and
disconnecting the relay by the battery management system.

* * * * *